US007379436B2

(12) United States Patent
Jiang

(10) Patent No.: US 7,379,436 B2
(45) Date of Patent: May 27, 2008

(54) INTEGRATED CELLULAR VOIP FOR CALL REROUTING

(75) Inventor: Yue Jun Jiang, Danville, CA (US)

(73) Assignee: Roamware Inc., San Jose, CA (US)

( * ) Notice: Subject to any disclaimer, the term of this patent is extended or adjusted under 35 U.S.C. 154(b) by 316 days.

(21) Appl. No.: 11/064,200

(22) Filed: Feb. 23, 2005

(65) Prior Publication Data

US 2005/0186960 A1    Aug. 25, 2005

Related U.S. Application Data

(60) Provisional application No. 60/547,389, filed on Feb. 23, 2004, provisional application No. 60/547,399, filed on Feb. 23, 2004.

(51) Int. Cl.
*H04Q 7/00* (2006.01)
(52) U.S. Cl. .................. 370/328; 370/329; 370/331; 455/432.1; 455/435.1; 455/450; 455/436
(58) Field of Classification Search .............. 370/328, 370/329, 331; 455/432.1, 435.1, 450, 436
See application file for complete search history.

(56) References Cited

U.S. PATENT DOCUMENTS

| | | | |
|---|---|---|---|
| 5,353,328 A | 10/1994 | Jokimies | |
| 5,586,166 A | 12/1996 | Turban | |
| 5,590,175 A * | 12/1996 | Gallant et al. | ............... 455/433 |
| 5,903,832 A | 5/1999 | Seppanen et al. | |
| 5,920,820 A * | 7/1999 | Qureshi et al. | ............... 455/433 |
| 5,930,701 A | 7/1999 | Skog | |
| 5,943,620 A | 8/1999 | Boltz et al. | |
| 5,987,318 A | 11/1999 | Alperovich et al. | |

(Continued)

FOREIGN PATENT DOCUMENTS

CA    2281041 A1    2/2001

(Continued)

OTHER PUBLICATIONS

"Digital cellular telecommunications system (Phase 2+); Specification of the SIM Application Toolkit for the Subscriber Identity Module-Mobile Equipment (SIM-ME) interface (GSM 11.14 version 8.3.0 Release 1999)" ETSI TS 101 267 V8.3.0, Aug. 2000, pp. 1-69 and pp. 114-115 (XP-002222021).

(Continued)

*Primary Examiner*—Nghi H. Ly
(74) *Attorney, Agent, or Firm*—Arent Fox LLP

(57) ABSTRACT

Integrated Cellular Voice over Internet Protocol ("VoIP") systems ("ICV systems") are described that redirect or reroute wireless network voice and data traffic to roaming subscribers via VoIP networks. The ICV system monitors roaming links of a first communication system. The first communication system may include a home network and a visited network. The ICV system detects a mobile device registering with the visited network. The ICV system receives location information corresponding to a location of the mobile device and selects a routing number corresponding to the location. The ICV system uses the selected routing number to transfer calls received at the home network to the mobile device via a second communication system.

38 Claims, 8 Drawing Sheets

U.S. PATENT DOCUMENTS

| | | | |
|---|---|---|---|
| 5,987,325 | A | 11/1999 | Tayloe |
| 6,014,561 | A | 1/2000 | Mölne |
| 6,052,604 | A | 4/2000 | Bishop et al. |
| 6,058,309 | A | 5/2000 | Huang et al. |
| 6,075,855 | A | 6/2000 | Christiansen et al. |
| 6,138,005 | A | 10/2000 | Park |
| 6,148,197 | A | 11/2000 | Bridges et al. |
| 6,163,701 | A | 12/2000 | Saleh et al. |
| 6,185,295 | B1 | 2/2001 | Frederiksen et al. |
| 6,192,255 | B1 | 2/2001 | Lewis et al. |
| 6,195,532 | B1 | 2/2001 | Bamburak et al. |
| 6,456,845 | B1 | 9/2002 | Drum et al. |
| 6,456,859 | B1 | 9/2002 | Desblancs et al. |
| 6,463,298 | B1 | 10/2002 | Sorensen et al. |
| 6,603,986 | B1 | 8/2003 | Anvekar et al. |
| 6,738,636 | B2 | 5/2004 | Lielbridis |
| 6,764,003 | B1 | 7/2004 | Martschitsch et al. |
| 6,795,444 | B1 * | 9/2004 | Vo et al. .................. 370/401 |
| 6,856,818 | B1 | 2/2005 | Ford |
| 6,961,559 | B1 * | 11/2005 | Chow et al. ............ 455/414.1 |
| 2002/0012351 | A1 | 1/2002 | Sofer et al. |
| 2002/0160763 | A1 | 10/2002 | Mittal et al. |
| 2002/0191575 | A1 | 12/2002 | Kalavade et al. |
| 2003/0064723 | A1 | 4/2003 | Thakker |
| 2003/0129991 | A1 | 7/2003 | Allison et al. |

FOREIGN PATENT DOCUMENTS

| | | |
|---|---|---|
| WO | WO 00/18156 | 3/2000 |
| WO | WO 01/65884 A1 | 9/2001 |
| WO | WO 03/019969 A1 | 3/2003 |

OTHER PUBLICATIONS

"Digital cellular telecommunications system (Phase 2+); Universal Mobile Telecommunications System (UMTS); General Packet Radio Service (GPRS) Service description; Stage 2 (3GPP TS 23.060 version 5.4.0 Release 5)" ETSI TS 123 060 V5.4.0, Dec. 2002, pp. 1-207 (XP-014007573).

"Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 5.4.0 Release 5)" ETSI TS 129 060 V5.4.0, Dec. 2002, pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brünen, M. "Roaming im Zugangsnetz Mit OWLAN überall zu Hause sein," Net—Zeitschrift Fuer Kommunikationsmanagement, Huthig Verlag, Heilderberg, 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).

Ostroski, F., "Roaming und Handover zwischen UMTS und Funk-LA," NTZ (Nachrichtentechnische zeitschrift), 2002, pp. 24-26 (XP-001124094).

Salkintzis, et al., "WLAN-GPRS Integration for Next-Generation Mobile Data Networks," IEEE Wireless Communications, Oct. 2002, pp. 112-123 (XP-001132263).

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

* cited by examiner

US 7,379,436 B2

INTEGRATED CELLULAR VOIP FOR CALL REROUTING

RELATED APPLICATION

This application claims the benefit of U.S. Patent Application Nos. 60/547,389 and 60/547,399, filed Feb. 23, 2004. This application also relates to U.S. patent application Ser. Nos. 10/635,804, filed Aug. 5, 2003, and Ser. No. 10/778,970, filed Feb. 13, 2004.

TECHNICAL FIELD

The disclosure herein relates to portable communication networks and devices.

BACKGROUND

Voice-over Internet Protocol ("IP") ("VoIP") services use the IP protocol for the transport of voice-related services. By using the shared data bandwidth of the IP network, VoIP offers much cheaper rates particularly on international destinations over traditional dedicated circuit-switched voice service. VoIP can also provide better integration of other data services such as multimedia, context, and video than traditional circuit-switched voice service.

VoIP telephones have been successfully used by many enterprises. Although consumers mostly still use traditional telephones, many also (perhaps unknowingly) benefit from VoIP service for international calls.

The concept of integrating cellular data service with Wireless Fidelity ("WiFi") data service has recently been available to consumers. This cellular/WiFi integration allows subscribers to roam seamlessly between cellular data services such as GPRS/1XRT and WiFi services, and to use WiFi services whenever available and to use cellular services whenever WiFi services are not available and cellular services are available.

The concept of integrating cellular data service with WiFi has also recently been extended to support VoIP services combining cellular phones and WiFi. A GSM-WiFi telephone has been introduced that allows subscribers to make telephone calls over an available WiFi service, otherwise the telephone functions like a typical cellular telephone. However when a cellular subscriber is roaming and receives a call on his/her cellular telephone, the received call is routed to the subscriber's cellular telephone via the cellular network. This prevents the subscriber from taking advantage of the VoIP and/or WiFi services, and can be particularly costly to outbound roamers who will have to pay for the rerouted leg of the international call. Consequently there is a need to provide cellular VoIP service to roaming cellular subscribers.

There are many mobile or cellular network operators, or providers, in the world, often more than one in a single country. These network operators include, but are not limited to, operators who provide mobility services using a variety of protocols (e.g., GSM, GPRS, 3G, CDMA, TDMA, etc.) or their variants. These network operators provide voice and data services to their own subscribers and to subscribers from other networks. When the network operator provides service to a subscriber from a foreign country, it is referred to as "international roaming". When the network operator provides service to a subscriber from another network in the same country, it is referred to as "domestic roaming".

When the subscriber is registered in the network with which it has a direct billing relationship, the serving network is often referred to as the Home Public Mobile Network ("HPMN"). If the subscriber is in a network with which it does not have a direct billing relationship, the serving network is referred to as the Visited Public Mobile Network ("VPMN"), and the subscriber is referred to as an "inbound roamer" by the VPMN. The same subscriber is referred to as an "outbound roamer" by the HPMN. In such a case, the inbound roamers are treated as temporary subscribers from a service availability perspective, while the billing for usage incurred by them is through inter-carrier settlements via the home network of the subscriber. Consequently there is a need to provide cellular VoIP service to inbound and outbound roaming cellular subscribers.

INCORPORATION BY REFERENCE

Each publication and patent application mentioned in this specification is herein incorporated by reference in its entirety to the same extent as if each individual publication or patent application was specifically and individually indicated to be incorporated by reference.

ACRONYMS

Figure 1:
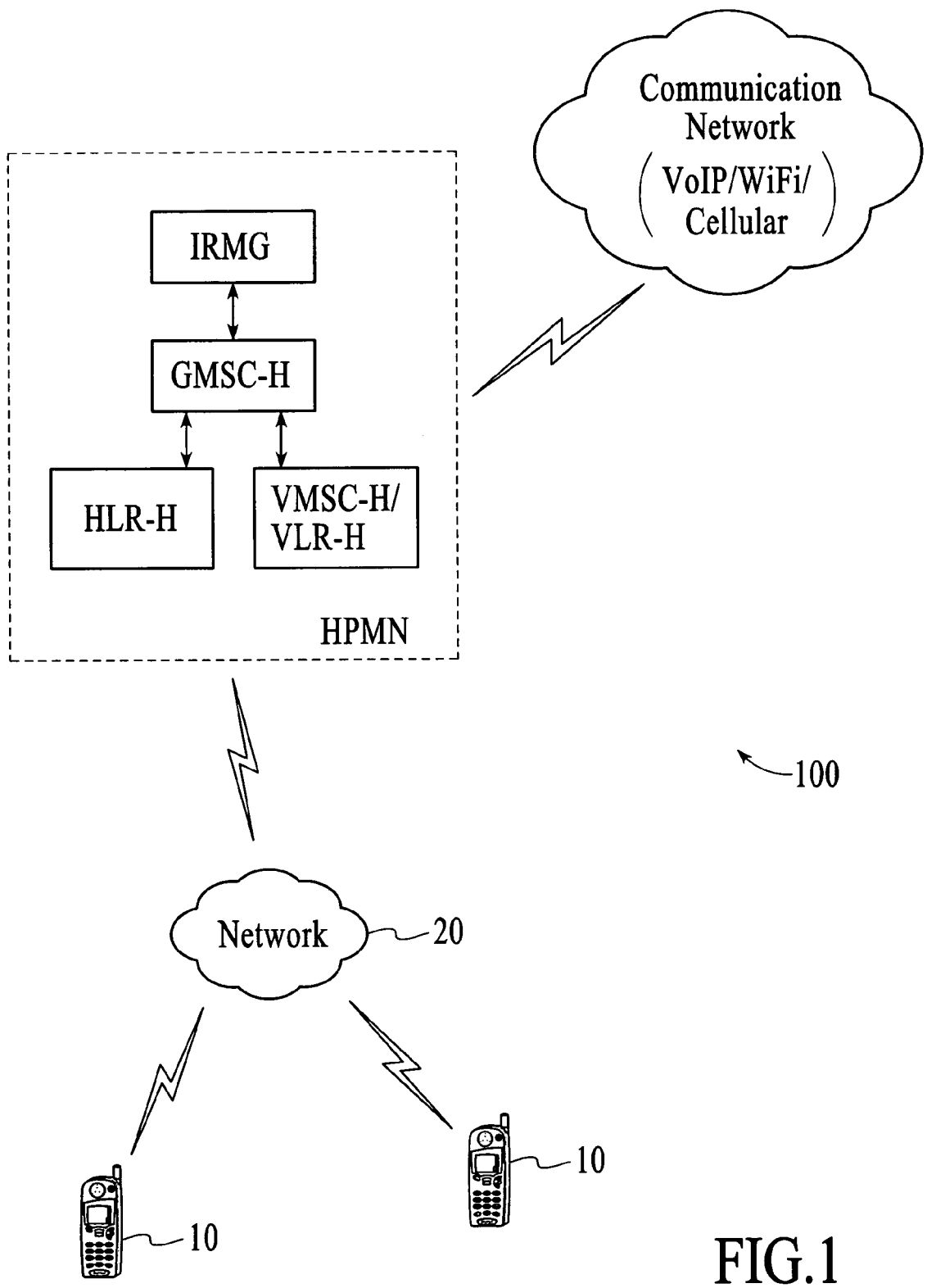
FIG. 1 is a diagram showing a communication system that includes a Home Public Mobile Network ("HPMN") that provides traffic redirection to subscribers using VoIP, under an embodiment.

International Mobile Subscriber Identity (of HPMN) (IMSI);
Integrated Service Digital Network (ISDN);
Mobile Subscriber ISDN Number (phone number) (MSISDN);
Home Public Mobile Network who intends to provide MSISDN Service (HPMN);
Visited Public Mobile Network (other than HPMN) (VPMN);
Mobile Switching Center (MSC);
Gateway MSC (GMSC);
GMSC in HPMN (GMSC-H);
GMSC in VPMN (GMSC-V);
MSISDN of the Multiple MSISDN Service allocated by HPMN in HPMN numbering plan (MSISDN-H);
Signaling System 7 (SS7);

Visited Mobile Switching Center (VMSC);
Serving VMSC in HPMN (VMSC-H);
Serving VMSC in VPMN (VPMN is not HPMN/FPMN) (VMSC-V);
General Packet Radio Service (GPRS);
Global Title (SS7 parlance) (GT);
Home Location Register (HLR);
International Roaming Expert Group (IREG);
Initial Address Message (IAM);
ISDN User Part message from SS7 stack (ISUP);
Message Application Part (from GSM 09.02 GSM Standards) (MAP);
Mobile Global Title (derived from IMSI) (MGT);
Mobile Station Roaming Number (MSRN);
Outreach Messaging (Enhanced version of legacy SMS Welcome) (OM);
Optimized Routing (OR);
Provide Roaming Number MAP message (PRN);
Service Control Point (SCP);
Signaling Connection Control Part (SCCP);
Send Routing Information MAP message (SRI);
Short Message Service (SMS);
Transfer Accounting Procedure (TAP);
Transfer Accounting Data Interchange Group (TADIG);
Transaction Capability Part (TCAP);
Translation Type (SS7 parlance) (TT);
Visited Location Register (VLR);
Serving VLR in HPMN (VLR-H);
Serving VLR in VPMN (VPMN is not HPMN/FPMN) (VLR-V);
Wireless Fidelity (WiFi);
Basic Call State Model (BCSM);
InitialDP (IDP);
Information Element (IE);
Information Flow (IF);
Intelligent Peripheral (IP);
IP Multimedia Subsystem Service Control Interface (ISC);
Mobile Forwarding (MF);
Mobile Location Center (MLC);
Mobile Originating (MO);
Mobile Terminating in GMSC (MT);
North American (NA);
Network Node Interface (NNI);
Operator Determined Barring (ODB);
Public Land Mobile Network (PLMN);
Serving GPRS Support Node (SGSN);
Service Logic Program Instance (SLPI);
Service Management Function (SMF);
Serving MLC (SMLC);
Customized Applications for Mobile network Enhanced Logic (CAMEL);
CAMEL Subscription Information (CSI);
Trigger Detection Point (TDP);
Transfer Protocol Data Unit (TPDU);
User Network Interface (UNI);
Mobile Terminating in VMSC (VT).

DETAILED DESCRIPTION

Integrated Cellular VoIP systems and methods are described for redirecting or rerouting wireless network voice and data traffic to roaming mobile devices of subscribers. The Integrated Cellular VoIP systems and methods are collectively referred to herein as the "ICV system", but are not so limited. The ICV system generally monitors roaming links of a first communication system. The first communication system may include a home network and a visited network that are cellular networks. The ICV system detects a mobile device registering with the visited network. The ICV system receives location information corresponding to a location of the mobile device and selects a routing number corresponding to the location. The ICV system uses the selected routing number to transfer calls received at the home network to the mobile device via a second communication system. The second communication system may be a VoIP system.

The following description provides specific details for a thorough understanding of, and enabling description for, embodiments of the ICV system. However, one skilled in the art will understand that the ICV system may be practiced without these details. In other instances, well-known structures and functions have not been shown or described in detail to avoid unnecessarily obscuring the description of the embodiments of the ICV system.

Terms such as handset, subscriber, user, etc., may herein be used interchangeably to indicate an actor that is registering with a network. These terms are used for convenience, but in fact, the actor that registers with the network could be any combination of hardware and software capable of registering on a wireless network, e.g., a personal digital assistant ("PDA") and/or personal computer ("PC").

FIG. 1 is a diagram showing a communication system 100 that includes a Home Public Mobile Network ("HPMN") that provides traffic redirection to subscribers 10 using VoIP, under an embodiment. The subscriber 10 is a "home" subscriber from the perspective of the HPMN network operator. The subscriber 10 uses a mobile device or handset which communicates over the wireless network 20 with the HPMN through a number of components as appropriate to the network 20. The HPMN of an embodiment includes for example a GMSC-H coupled to one or more of an Intelligent Roaming Management Gateway ("IRMG"), a Home Location Register ("HLR-H"), a Visited Mobile Switching Center ("VMSC-H"), and a Visited Location Register ("VLR-H"). The HPMN couples to communicate with one or more communication networks 30, including but not limited to VoIP networks, WiFi networks, and public switched telephone networks ("PTSN") for example.

The network 20 and/or the communication network 30 may include service provider networks that include, for example, GSM service and/or other cellular service, VoIP service, and/or WiFi service, but the embodiment is not so limited. The HPMN couples to each of the networks 20 and 30 for information exchange via network or bus couplings as appropriate to the network type, where the couplings include at least one of wireless, wired, and hybrid wireless/wired couplings/connections. Further, the networks/network couplings can include any of a number of network types known in the art including, but not limited to, local area networks (LANs), metropolitan area networks (MANs), wide area networks (WANs), proprietary networks, backend petworks, and the Internet.

The mobile devices described herein include, for example, cellular telephones, PCs, portable computing devices, portable telephones, portable communication devices, subscriber devices or units, and PDAs. The mobile devices, which also may be referred to as "mobile communication devices," "portable communication devices" and "communication devices," can include all such devices and equivalents, and are not limited to communication devices that are wireless. The communication networks described herein support the transfer of information including voice and data signals between the mobile devices and the operator or service provider systems via at least one of wireless couplings, wired couplings, and a combination of wireless/wired couplings using one or more communication protocols known in the art. The networks described herein can use at least one of Global System for Mobile Communications (GSM), General Packet Radio Service (GPRS), Code Division Multiple Access (CDMA), and Time Division Multiple Access (TDMA) communication protocols, for example, but are not so limited.

The ICV system described herein integrates VoIP with SS7 signaling and, in contrast to typical integrated communication systems, allows roaming subscribers to receive telephone calls via VoIP calls on a cellular telephone. The ICV system also supports integrated cellular-WiFi services to cellular telephones. The ICS system also supports multiple cellular technologies including GSM, CDMA, and TDMA, to name a few. The technology involves an Intelligent Roaming Management Gateway (IRMG), also referred to as a central gateway or gateway, coupled to the cellular network, as described herein.

The SS7 signaling is a Common Channel Signaling ("CCS") system defined by the International Telecommunications Union-Telecommunication Standardization Sector ("ITU-T"). The SS7 signaling is used in telecommunication networks and provides a suite of protocols which enables circuit and non circuit related information to be routed about and between networks. The protocols of SS7 signaling include but are not limited to Message Transfer Part ("MTP"), Signaling Connection Control Part ("SCCP"), and Integrated Service Digital Network ("ISDN") User Part ("ISUP").

Figure 2:
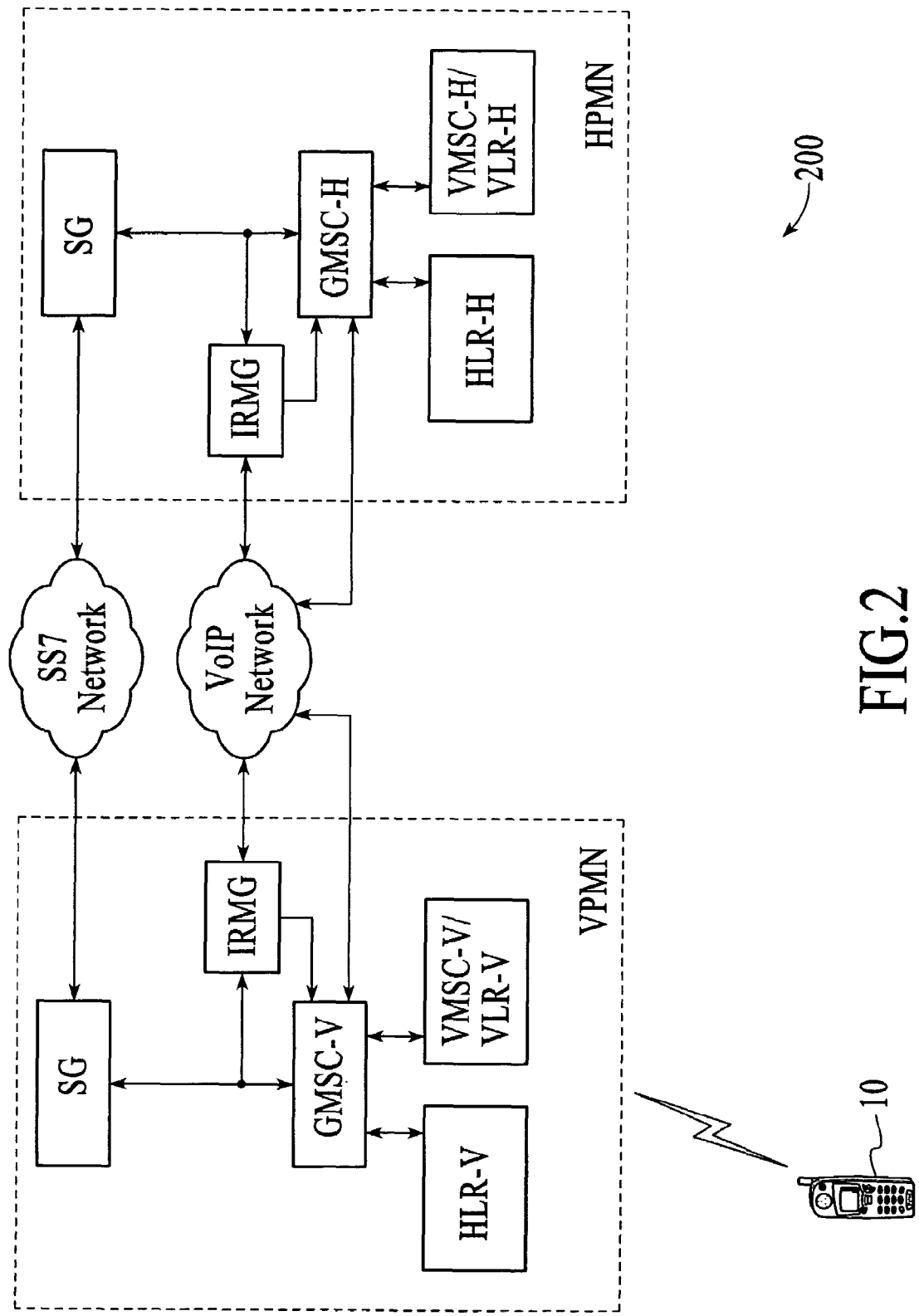
FIG. 2 is a diagram of a communication system that includes an HPMN and a Visited Public Mobile Network ("VPMN") providing traffic redirection to a roaming subscriber using VoIP, under an embodiment.

FIG. 2 is a diagram of a communication system 200 that includes a HPMN and a Visited Public Mobile Network ("VPMN") providing traffic redirection to a roaming subscriber 10 using VoIP, under an embodiment. The subscriber 10 is a "home" subscriber from the perspective of the HPMN network operator. As described above, the HPMN of an embodiment includes for example a GMSC-H coupled to one or more of an IRMG, a Signal Gateway ("SG"), an HLR-H, a VMSC-H, and a VLR-H. The VPMN of an embodiment includes a GMSC-V coupled to one or more of an IRMG, a SG, a Home Location Register ("HLR-V"), a Visited Mobile Switching Center ("VMSC-V"), and a Visited Location Register ("VLR-V") to name a few. Components of the HPMN and the VPMN couple to communicate via one or more communication networks that include an SS7 signaling network ("SS7 network") and a VoIP network for example.

The IRMG of an embodiment is not limited to being hosted at the HPMN and/or the VPMN. Consequently, the communication system 200 of various alternative embodiments may include an IRMG associated with at least one of the HPMN, the VPMN, the SS7 network, and the VoIP network. Furthermore, the communication system 200 of various alternative embodiments may distribute functions of the IRMG across one or more components of at least one of the HPMN, the VPMN, the SS7 network, and the VoIP network.

The ICV system, according to an embodiment, generally monitors the SS7 MAP signaling messages on the external signaling links between the operator GMSC and the signaling provider. The monitoring may be one of active and passive monitoring, as described in the Related Applications. With reference to FIG. 2, the mobile subscriber 10 is roaming in a VPMN. The VPMN and the subscriber's HPMN have a roaming relationship such that the HPMN subscribers are allowed to get service on the VPMN. When the roaming mobile subscriber's handset registers on the VPMN, it initiates a registration process such that the VLR-V sends a MAP Update Location message to the HLR-H in the HPMN of the roaming subscriber 10. The monitoring includes monitoring of any MAP messages. The HPMN and/or VPMN use information of the monitoring to reroute calls to/from the subscriber 10 using the VoIP network as described below.

The ICV system allows roamers to receive incoming calls over an IP network using either an ordinary cellular telephone and/or a cellular-WiFi telephone. Although the description below focuses on GSM MAP signaling, it can be similarly extended to CDMA and/or TDMA using ANSI-41 MAP. While the description below includes references to GSM phones as well as GSM-WiFi telephones the embodiments are not so limited because the ICV system can be similarly extended to other cellular or wireless technologies; GSM is an example used herein only to illustrate ICV system functionality.

The ICV system described herein integrates VoIP technology with SS7 technology to allow roaming subscribers to receive telephone calls via VoIP calls on a cellular telephone. The ICV service provided by the ICV system may be subscription-based, that is the special VoIP rerouting is only performed for outbound roamers who subscribed to this service, but is not so limited. The ICV system of an embodiment can be applied to both inbound roamers and outbound roamers, but is not so limited. Descriptions including each of outbound and inbound roamers follow.

Figure 3:
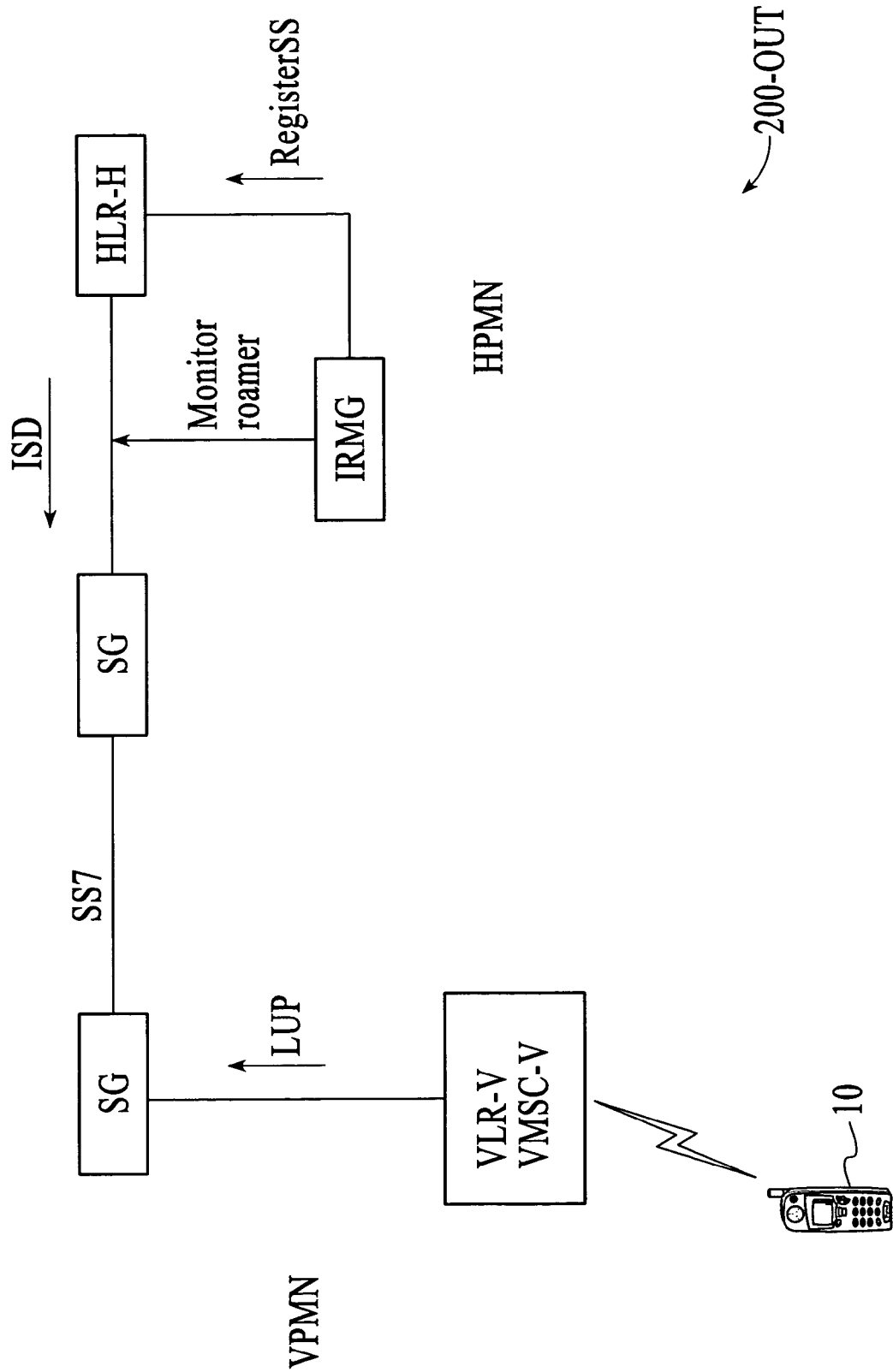
FIG. 3 is an ICV system that supports outbound roamers, under an embodiment.
Figure 4:
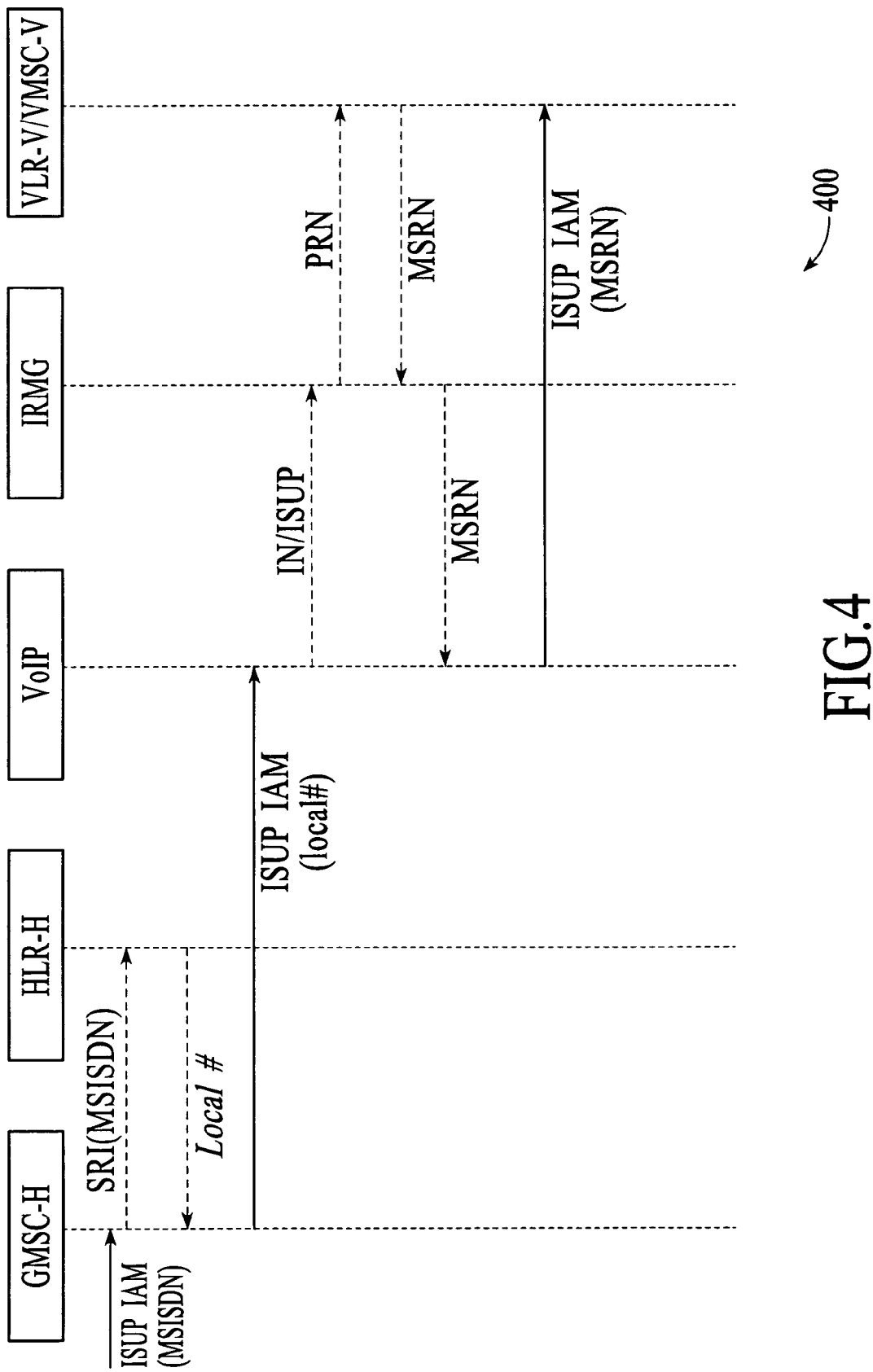
FIG. 4 is a signal flow diagram for support of outbound roamers in the ICV system, under an embodiment.

The ICV system of an embodiment supports outbound roamers using the IRMG and the VoIP network for example. FIG. 3 is an ICV system 200-OUT that supports outbound roamers 10, under an embodiment. FIG. 4 is a signal flow diagram 400 for support of outbound roamers in the ICV system 200-OUT, under an embodiment. With reference to FIG. 2-4, the HPMN of outbound roamers monitors SS7 roaming links using the IRMG and at least one of interception and probe monitoring techniques. On detecting an outbound roamer registering in a VPMN or foreign network, the HPMN IRMG captures the roamer's location information (e.g., IMSI, VLR, VMSC, subscription information, etc.) from the MAP transaction messages (e.g. LUP, ISD, CancelLoc, PurgeMS, RestoreData, etc.) transferred between the VLR-V and the HLR-H. The location information can also be used to send SMS and/or MMS messages (e.g., "Welcome" messages) to outbound roamers or just for statistical analysis.

For each location change of an outbound roamer, the HPMN IRMG determines if the outbound roamer has unconditional call forwarding (CFU) set using SS7 MAP-interrogateSS or using information of the HPMN cache (not shown). If unconditional call forwarding is not set, or is set by HPMN IRMG, the HPMN IRMG selects a local number and issues a SS7 MAP-RegisterSS message to register the number at the outbound roamer's HLR-H for unconditional call forwarding. The local number may be selected from a pool of specially ranged local routing numbers for the VoIP network, but is not so limited. The VoIP network can assign a pool of specially ranged local numbers per country, zone, and/or network (HPMN). The VoIP network may be a partner of the HPMN operator, or the HPMN operator itself, but is not so limited.

The HPMN IRMG can select a number from the pool of local numbers that corresponds to the outbound roamer's location, where the location is one or more of country, zone, and/or network. When receiving a call for the outbound roamer's MSISDN, the HPMN forwards the call to the VoIP network. One or more components of the VoIP network (e.g., switch) are configured to trigger a signaling (e.g. IN or ISUP loopback, using SS7 or SS7 over IP) to the HPMN IRMG on the selected local number. The IRMG issues MAP-PRN to the outbound roamer's VLR to find the Mobile Station Routing Number ("MSRN") to return to the VoIP network (e.g., switch). The VoIP network then routes the received call via its IP network to the VPMN in which the subscriber is roaming. On detecting that the outbound roamer is no longer in a foreign network (VPMN) (via monitoring of CancelLoc and PurgeMS MAP messages), the IRMG disables the CFU using MAP-RegisterSS. The SMS is not affected by the call forwarding via the VoIP network because the SRI-SM continues to receive the VMSC in the HLR.

Figure 5:
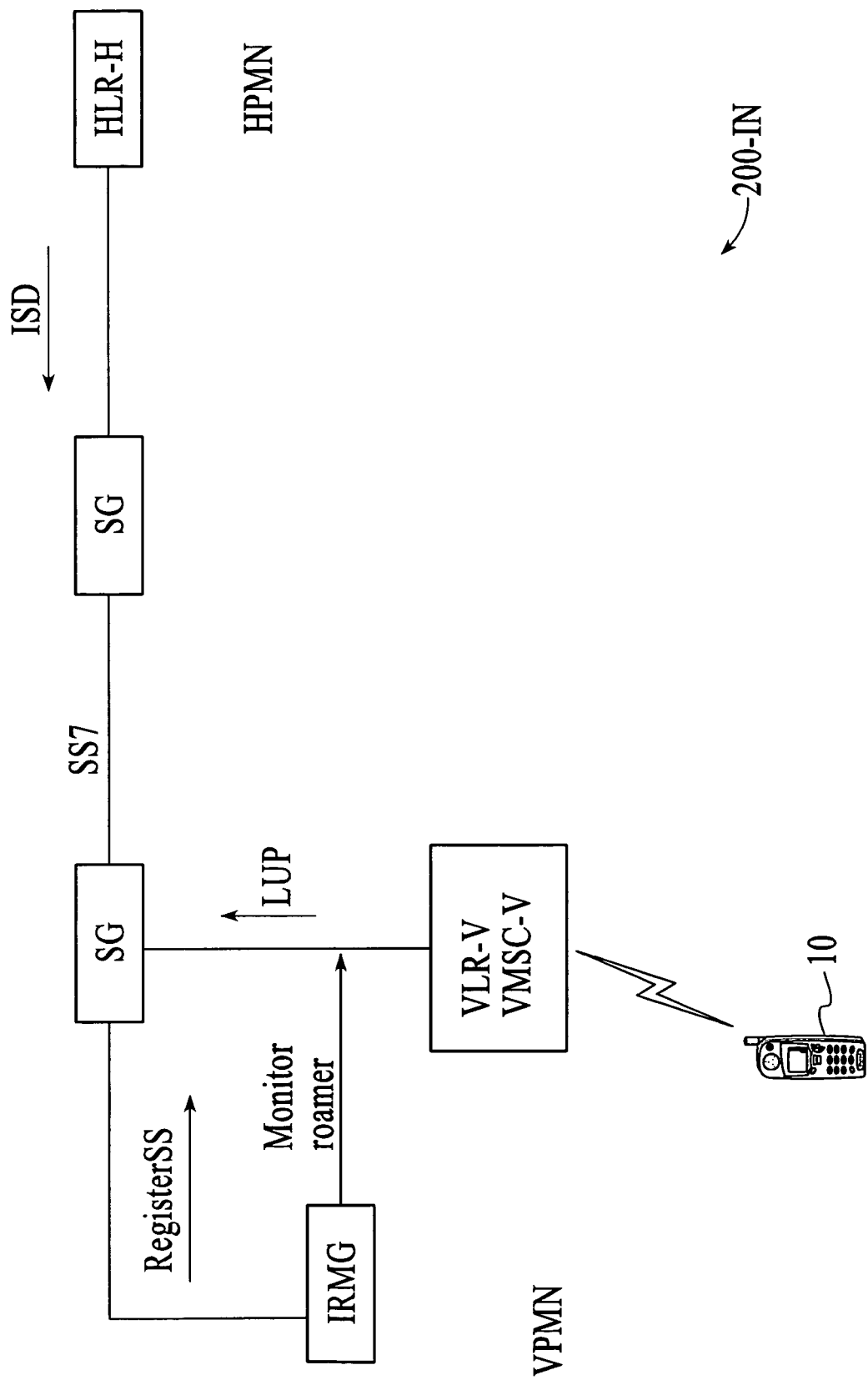
FIG. 5 is a diagram of an ICV system that supports inbound roamers, under an embodiment.
Figure 6:
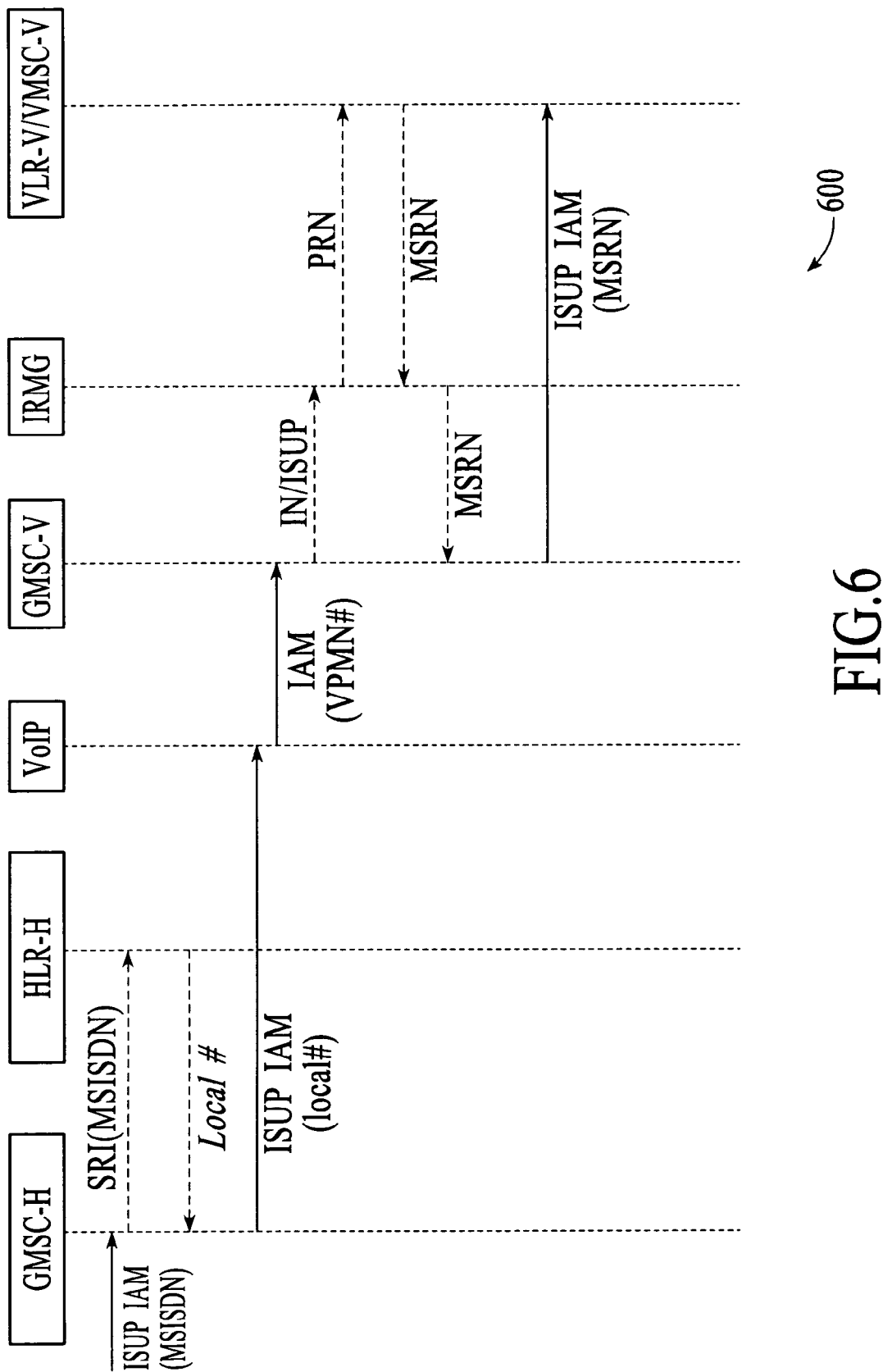
FIG. 6 is a signal flow diagram for support of inbound roamers in the ICV system, under an embodiment.

The ICV system of an embodiment also supports inbound roamers using the IRMG and the VoIP network as described above. FIG. 5 is a diagram of an ICV system 200-IN that supports inbound roamers 10, under an embodiment. FIG. 6 is a signal flow diagram 600 for support of inbound roamers in the ICV system 200-IN, under an embodiment. With reference to FIGS. 2, 5, and 6, the VPMN operator of inbound roamers monitors SS7 roaming links using the VPMN IRMG and at least one of interception and probe monitoring technique. On detecting an inbound roamer registering in the VPMN, the VPMN IRMG captures the roamer's location information (e.g., IMSI, VLR, VMSC, subscription information, etc.) from the MAP transaction messages (e.g. LUP, ISD, CancelLoc, PurgeMS, RestoreData etc) transferred between the VLR-V and HLR-H. The location information can be used to send SMS and/or MMS messages (e.g., "Welcome" messages) to inbound roamers or just for statistical analysis.

For each location change of an inbound roamer, the VPMN IRMG determines if the inbound roamer has unconditional call forwarding (CFU) set using SS7 MAP-interrogateSS or using information of the VPMN cache (not shown). The VPMN of alternative embodiments may use other methods including SendParameters, restoreData, and/or AnyTimeSubscriptionInterrogation, restoreData instead of InterrogateSS to determine if the inbound roamer has unconditional call forwarding set. If unconditional call forwarding is not set, or is set by VPMN IRMG, the VPMN IRMG selects a local number from the HPMN country and issues a SS7 MAP-RegisterSS message to register the number at the inbound roamer's HLR-H for unconditional call forwarding. The local number may be selected from a pool of specially ranged local routing numbers for the VoIP network, but is not so limited. The VoIP network can assign a pool of specially ranged local numbers per country, zone, and/or network (VPMN). The association can be created dynamically at the time the MAP-RegisterSS is issued or be statically maintained at the VoIP network. The VoIP network may be a partner of the VPMN operator, or the VPMN operator itself, but is not so limited.

The VPMN IRMG can select a number from the pool of specially ranged local numbers that corresponds to the inbound roamer's country, zone, and/or network. When receiving a call for the inbound roamer's MSISDN, the HPMN forwards the call to the VoIP network. One or more components of the VoIP network (e.g., switch) are configured to route the received call to the VPMN via the corresponding VPMN number associated with the local number. The VoIP network is configured to trigger a signaling (e.g. IN or ISUP loopback, using SS7 or SS7 over IP) to the VPMN IRMG on the specially ranged VPMN number. The VPMN IRMG issues MAP-PRN to the inbound roamer's VLR-V to find the MSRN to return to the VoIP network. The VoIP network then routes the call to the inbound roamer's VMSC-V.

On detecting that the inbound roamer is no longer in the VPMN (via monitoring of CancelLoc and PurgeMS MAP messages), the VPMN IRMG disables the CFU using MAP-RegisterSS. Note that SMS is not affected by the call forwarding via the VoIP network because the SRI-SM continues to receive the VMSC in the HLR.

Unless a special billing relationship is arranged between VPMN and HPMN, billing is done by reversing the MT TAP record to MO TAP record where the called party in the MO TAP record can be the original calling ID or the forwarded local number or just to another VPMN local number. In all cases, special rates can be arranged.

Because MT TAP is reversed to MO-TAP without a special billing relationship between VPMN and HPMN, the inbound roaming solution will not be applied to prepaid roamers. Call barring, ODB, CSI in the roamer's subscription profile from monitoring can be used to induce a roamer as prepaid.

An example of the ICV system follows that provides GSM-WiFi VoIP service using a GSM-WiFi telephone. The embodiments however can be applied to devices coupled to an IP network, where the devices include, but are not limited to, GSM-bluetooth and GSM-USB. The GSM-WiFi telephone can have a WiFi-ethernet adaptor that functions like a mini access point. When there is only an Ethernet connection available (e.g. hotels), the roamer can use the adaptor to function like an access point to be used by the GSM-WiFi telephone.

The GSM-WiFi VoIP service can be applied to inbound roamers or to outbound roamers independent of wireless operators. The subscriber will however be a subscriber of a VoIP service. The VoIP service can be provided by the HPMN operator in partnership with a VoIP provider, but is not so limited.

Figure 7:
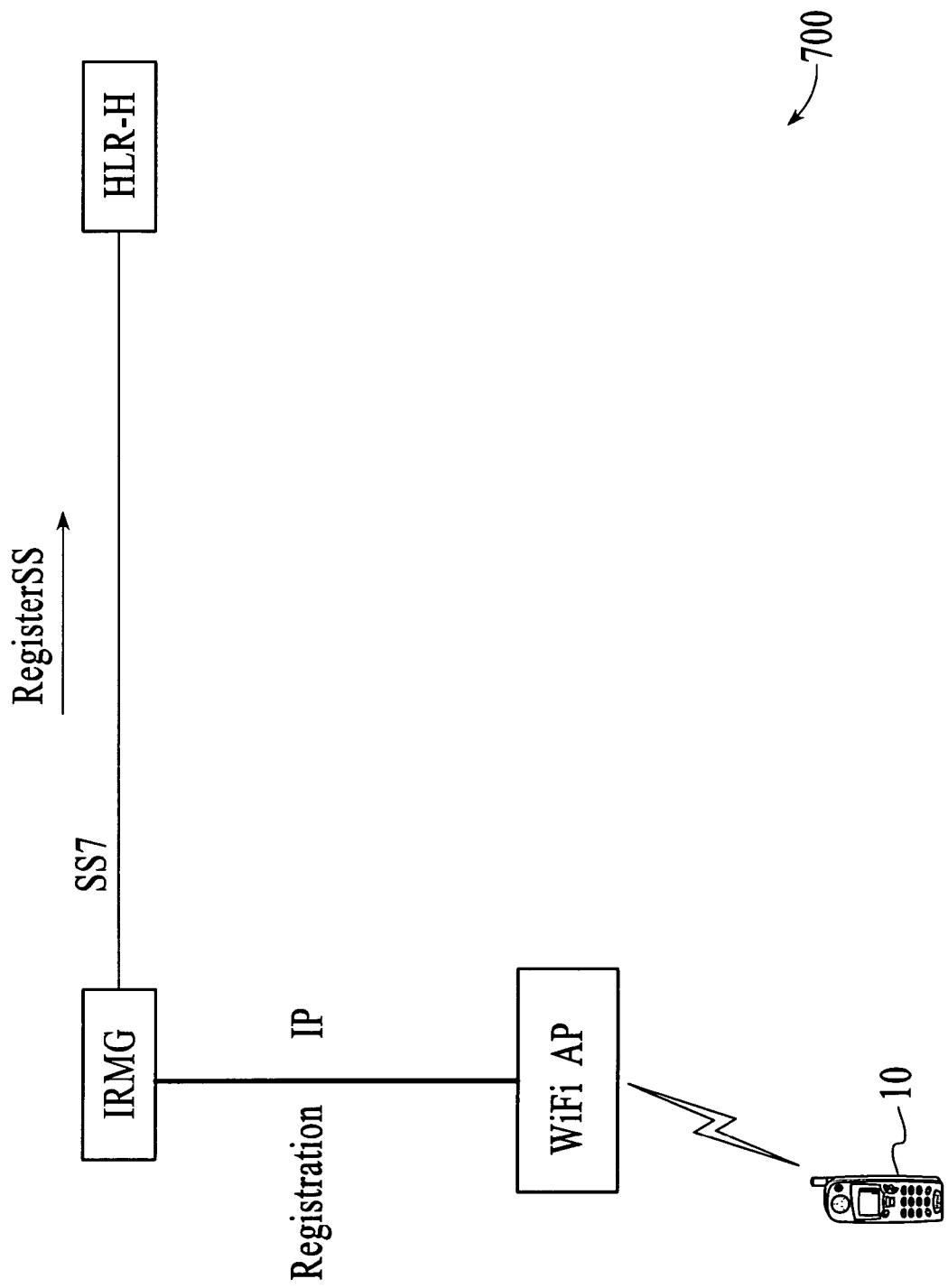
FIG. 7 is a diagram of a communication system that includes an Intelligent Roaming Management Gateway ("IRMG") supporting GSM-WiFi VoIP service on a mobile device, under an embodiment.
Figure 8:
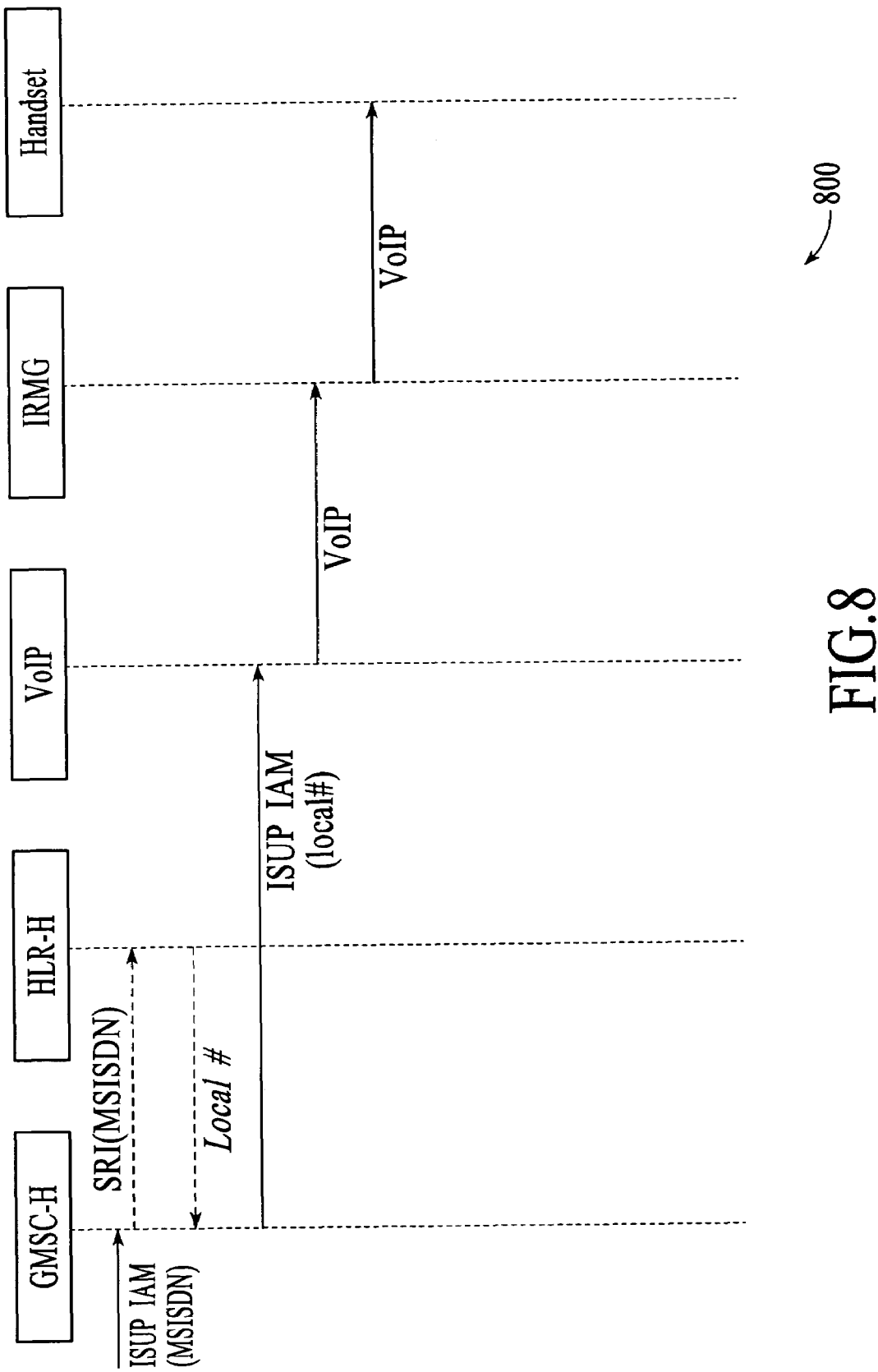
FIG. 8 is a signal flow diagram for support of GSM-WiFi VoIP service using the IRMG, under an embodiment.

As an example, FIG. 7 is a diagram of a communication system 700 that includes an IRMG supporting GSM-WiFi VoIP service on a mobile device 10, under an embodiment. FIG. 8 is a signal flow diagram 800 for support of GSM-WiFi VoIP service using the IRMG, under an embodiment. When the subscriber's handset 10 detects IP connectivity (e.g., thru the handset WiFi connection), a client in the handset sends a message to the central IRMG hosted in an IP network. The message includes a time stamp, the subscriber credentials and its MSISDN and IMSI if known. The subscriber credentials can be used to communicate over the IP network in a security protocol with the IRMG gateway. The security protocol (e.g. SSL/TLS) can be any type of protocol.

The IRMG may also couple to a SS7 network. The IRMG can determine the MSISDN from the IMSI (e.g., using MAP SendParameters, restoreData, etc.), or can determine the IMSI from the MSISDN (e.g., SRI-SM) if necessary. The IRMG uses MAP-InterrogateSS(IMSI) to determine if CFU is set. If CFU is not set or is set by the IRMG, the IRMG will use MAP-RegisterSS to set CFU to a local number at HPMN country of the roamer (inbound or outbound).

The IRMG associates the IP address with the local number. This CFU setting operation can also be limited to a roaming case when the handset is detected to be in a foreign country either by examining the IP address or the VMSC address by issuing SRI-SM.

When IP connectivity is detected, the handset client and IRMG also assess the speed of the IP network to determine if the speed meets the threshold of VoIP calls. The threshold essentially defines the Quality of Service ("QoS") of the subscription. Generally, however, the WiFi or WiFi-Ethernet IP network coupling will not have any bandwidth issues as to the quality of VoIP calls.

When receiving a call for the subscriber's MSISDN, the call is routed on the local number to the VoIP network. One or more components of the VoIP network transfer the call to the IRMG over the IP network based on the specially ranged local number. The IRMG determines the handset IP address from the local number. The IRMG gateway routes the call to the IP address directly. The VoIP protocol between the handset client and the IRMG gateway can be any of a number of industry standard protocols (e.g., SIP, RTP, etc.), proprietary protocols (e.g., CISCO), and combinations of standard and proprietary protocols. Upon detecting lost IP connectivity with the subscriber (via monitoring of the loss of IP connection to the IRMG), the IRMG disables the CFU using MAP-RegisterSS. Note that SMS is not affected by the call forwarding via the VoIP network because the SRI-SM continues to receive the VMSC in the HLR.

The client of the GSM-WiFi telephone can be used to provide value-added advanced services such as call management, personal-page, presence, availability, and telephone book network, to name a few. As an example, because the incoming call to the subscriber is routed over the IP network, it supports caller ID delivery so that the subscriber can choose to accept or forward the call based on the subscriber's forwarding conditions or explicit forwarding number set on the fly. Additionally, because the incoming call is routed over the IP network, the personal page associated with caller ID can be presented to the subscriber for browsing. Similarly, when the GSM-WiFi roamer makes a call (over IP or cellular network) when IP connectivity is available, the personal page associated with the called party can be presented to the subscriber.

The client of the GSM-WiFi telephone also indicates the presence of IP connectivity thereby allowing the subscriber to control its availability. The client can also know all calls made by the subscriber and calls received by the subscribers. This information can be automatically updated into a network-based phonebook. This phonebook can also be used to build associations among the contents of the phonebook.

Following are one or more examples of embodiments of the ICV system described herein, each of which may be used alone or in combination with other embodiments described herein. The ICV system of an example embodiment described herein includes a system comprising at least one of a first communication system comprising a home network and a visited network, at least one second communication system coupled to the home network and the visited network, and a gateway coupled to at least one of the first and second communication systems, wherein the gateway monitors roaming links of the first communication system and detects a mobile device registering with the visited network, wherein the gateway receives location information corresponding to a location of the mobile device and selects a routing number corresponding to the location, wherein the gateway uses the selected routing number to transfer calls received at the home network to the mobile device via the second communication system.

The first communication system of an embodiment is a cellular system.

The second communication system of an embodiment includes at least one of a Voice over Internet Protocol (VoIP) system and a Wireless Fidelity (WiFi) system.

Receiving location information of an embodiment further comprises receiving at least one of an International Mobile Subscriber Identity (IMSI), a Visited Location Register (VLR), a Visited Mobile Switching Center (VMSC), and subscription information of the mobile device.

Receiving location information of an embodiment further comprises receiving location information from Mobile Application Part (MAP) transaction messages between the mobile device and the first communication system.

The gateway of an embodiment determines if unconditional call forwarding is enabled at the mobile device.

Selecting a routing number of an embodiment further comprises selecting a local number from a set of numbers that corresponds to at least one of a country, zone, and network of the location of the mobile device.

The mobile device of an embodiment includes at least one of a cellular telephone, personal computer, portable computing device, portable telephone, portable communication device, subscriber device, and personal digital assistant.

The ICV system of another example embodiment described herein includes a system comprising at least one of a gateway coupled to first and second communication systems, and a client application coupled to a mobile device, the client application detecting a coupling with the second communication system and transferring a message to the gateway via the coupling, the message including identification information of the mobile device, wherein the gateway determines a routing number of the second communication system that corresponds to a location of the mobile device, wherein the gateway establishes an association between the routing number and an address of the mobile device on the second communication system, wherein the gateway transfers a call received at the first communication system to the mobile device via the second communication system using the routing number and address of the mobile device.

The ICV system of an example embodiment described herein further includes a system comprising at least one of circuitry that monitors roaming links of a first communication system, wherein the first communication system includes at least one of a home network and a visited network, circuitry that detects a mobile device registering with the visited network, circuitry that receives location information corresponding to a location of the mobile device, circuitry that selects a routing number corresponding to the location, and circuitry that uses the selected routing number to transfer calls received at the home network to the mobile device via a second communication system.

The ICV system of an example embodiment described herein includes a device comprising at least one of a monitoring system that monitors roaming links of a first communication system, wherein the first communication system includes at least one of a home network and a visited network, a detector that detects a mobile device registering with the visited network, a receiver that receives location information corresponding to a location of the mobile device, a selection system that selects a routing number corresponding to the location, and a transmitter that uses the selected routing number to transfer calls received at the home network to the mobile device via a second communication system.

The first communication system of an embodiment is a cellular system.

The second communication system of an embodiment includes at least one of a Voice over Internet Protocol (VoIP) system and a Wireless Fidelity (WiFi) system.

Receiving location information of an embodiment further comprises receiving at least one of an International Mobile Subscriber Identity (IMSI), a Visited Location Register (VLR), a Visited Mobile Switching Center (VMSC), and subscription information of the mobile device.

Receiving location information of an embodiment further comprises receiving location information from Mobile Application Part (MAP) transaction messages between the mobile device and the first communication system.

Selecting a routing number of an embodiment further comprises selecting a local number from a set of numbers that corresponds to at least one of a country, zone, and network of the location of the mobile device.

The mobile device of an embodiment includes at least one of a cellular telephone, personal computer, portable computing device, portable telephone, portable communication device, subscriber device, and personal digital assistant.

The ICV system of another example embodiment described herein includes a device comprising at least one of means for monitoring at least one roaming link of a first communication system, means for detecting a roaming device registering with a visited network, means for receiving location information corresponding to a location of the roaming device, means for selecting a routing number that corresponds to the location, the routing number corresponding to a second communication system, and means for transferring calls received at a home network to the roaming device via the second communication system in accordance with the routing number, wherein the home network and the visited network are networks operating under the first communication system.

The first communication system of an embodiment is a cellular system and the second communication system includes at least one of a Voice over Internet Protocol (VoIP) system and a Wireless Fidelity (WiFi) system.

The means for selecting of an embodiment further comprises means for selecting a local number from a set of numbers that corresponds to at least one of a country, zone, and network of the location of the mobile device.

The mobile device includes at least one of a cellular telephone, personal computer, portable computing device, portable telephone, portable communication device, subscriber device, and personal digital assistant.

The ICV system of an example embodiment described herein includes a method comprising at least one of monitoring at least one roaming link of a first communication system, detecting a roaming device registering with a visited network, receiving location information corresponding to a location of the roaming device, selecting a routing number that corresponds to the location, the routing number corresponding to a second communication system, and transferring calls received at a home network to the roaming device via the second communication system in accordance with the routing number, wherein the home network and the visited network are networks operating under the first communication system.

The first communication system of an embodiment is a cellular system.

The second communication system of an embodiment includes at least one of a Voice over Internet Protocol (VoIP) system and a Wireless Fidelity (WiFi) system.

Detecting of an embodiment further comprises at least one of intercepting a signal of the roaming device and probing the signal.

Receiving location information of an embodiment further comprises receiving at least one of an International Mobile Subscriber Identity (IMSI), a Visited Location Register (VLR), a Visited Mobile Switching Center (VMSC), and subscription information of the roaming device.

Receiving location information of an embodiment further comprises receiving location information from Mobile Application Part (MAP) transaction messages between the roaming device and the first communication system. The MAP transaction messages of an embodiment are transferred between a Home Location Register (HLR) of a Home Public Mobile Network (HPMN) of the roaming device and a Visited Location Register (VLR) of a Visited Public Mobile Network (VPMN) with which the roaming device is roaming.

The method of an embodiment further comprises determining if unconditional call forwarding is enabled at the roaming device.

The method of an embodiment further comprises registering the selected routing number at a Home Location Register (HLR) of a Home Public Mobile Network (HPMN) of the roaming device in response to determining that unconditional call forwarding is disabled.

The method of an embodiment further comprises assigning at least one set of routing numbers to the home network of the roaming device, wherein assigning includes the second communication system assigning the set of routing numbers.

Selecting a routing number of an embodiment further comprises selecting a local number from a set of numbers that corresponds to at least one of a country, zone, and network of the visited network.

Transferring of an embodiment further comprises at least one of forwarding the received call to the second communication system, requesting the selected routing number, receiving the selected routing number in response to the request, and routing the received call through the second communication system to the roaming device using the selected routing number. Requesting the selected routing number of an embodiment comprises transferring a request for the selected routing number from the second communication system to the visited network via the home network. Receiving the selected routing number comprises receiving the selected routing number at the second communication system from the visited network via the home network.

The roaming device of an embodiment includes at least one of cellular telephones, personal computers, portable computing devices, portable telephones, portable communication devices, subscriber devices, and personal digital assistants.

The ICV system of an example embodiment described herein further includes a method comprising at least one of detecting at a mobile device a coupling with an Internet Protocol (IP) network, transferring a message to a gateway of the IP network via the coupling, the message including identification information of the mobile device, selecting a routing number that corresponds to a location of the mobile device, the routing number corresponding to the IP network, establishing an association between the selected routing number and an IP address of the mobile device, and transferring a call received at a cellular network to the mobile device via the IP network using the routing number and the IP address of the mobile device.

The method of an embodiment further comprises determining the location of the mobile device.

The method of an embodiment further comprises determining if unconditional call forwarding is enabled at the mobile device.

The method of an embodiment further comprises assigning at least one set of routing numbers in response to the location of the mobile device.

Selecting a routing number of an embodiment further comprises selecting a local number from a set of numbers that corresponds to at least one of a country, zone, and network of the location of the mobile device.

The mobile device of an embodiment includes at least one of a cellular telephone, Wireless Fidelity (WiFi) device, personal computer, portable computing device, portable telephone, portable communication device, subscriber device, and personal digital assistant.

The components of the ICV system described above include any collection of computing components and devices operating together. The components of the ICV system can also be components or subsystems within a larger computer system or network. The ICV system components can also be coupled among any number of components (not shown), for example other buses, controllers, memory devices, and data input/output (I/O) devices, in any number of combinations. Further, functions of the ICV system can be distributed among any number/combination of other processor-based components.

Aspects of the ICV system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the ICV system include: microcontrollers with memory (such as electronically erasable programmable read only memory (EEPROM)), embedded microprocessors, firmware, software, etc. Furthermore, aspects of the ICV system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the ICV system is not intended to be exhaustive or to limit the ICV system to the precise form disclosed. While specific embodiments of, and examples for, the ICV system are described herein for illustrative purposes, various equivalent modifications are possible within the scope of the ICV system, as those skilled in the relevant art will recognize. The teachings of the ICV system provided herein can be applied to other processing systems and methods, not only for the systems and methods described above.

The elements and acts of the various embodiments described above can be combined to provide further embodiments. These and other changes can be made to the ICV system in light of the above detailed description.

In general, in the following claims, the terms used should not be construed to limit the ICV system to the specific embodiments disclosed in the specification and the claims, but should be construed to include all processing systems that operate under the claims. Accordingly, the ICV system is not limited by the disclosure, but instead the scope of the ICV system is to be determined entirely by the claims.

While certain aspects of the ICV system are presented below in certain claim forms, the inventors contemplate the various aspects of the ICV system in any number of claim forms. Accordingly, the inventors reserve the right to add additional claims after filing the application to pursue such additional claim forms for other aspects of the ICV system.

What is claimed is:

1. A system comprising:

a first communication system comprising a home network and a visited network, the home network having a subscriber and a Home Location Register (HLR), the subscriber having a mobile device and a profile in the HLR;

at least one Voice-over Internet Protocol (VoIP) communication system coupled to the home network and the visited network; and a gateway coupled to at least one of the first and the VoIP communication systems, wherein the gateway monitors roaming links of the first communication system and detects the mobile device registering with the visited network, wherein the gateway receives location information corresponding to a location of the mobile device and selects a VoIP routing number corresponding to the location, wherein the subscriber's HLR profile is set, via a SS7 message, to transfer calls for the mobile device via the selected VoIP routing number, and wherein the gateway uses the selected VoIP routing number to transfer calls for the mobile device received at the home network to the mobile device via the VoIP communication system.

2. The system of claim 1, wherein the first communication system is a cellular system.

3. The system of claim 1, wherein receiving location information further comprises receiving at least one of an International Mobile Subscriber Identity (IMSI), a Visited Location Register (VLR), a Visited Mobile Switching Center (VMSC), and subscription information of the mobile device.

4. The system of claim 1, wherein receiving location information further comprises receiving location information from Mobile Application Part (MAP) transaction messages between the mobile device and the first communication system.

5. The system of claim 1, wherein the gateway determines if unconditional call forwarding is enabled at the mobile device.

6. The system of claim 1, wherein selecting a VoIP routing number further comprises selecting a local number from a set of numbers that corresponds to at least one of a country, zone, and network of the location of the mobile device.

7. The system of claim 1, wherein the mobile device includes at least one of a cellular telephone, personal computer, portable computing device, portable telephone, portable communication device, subscriber device, and personal digital assistant.

8. A system comprising:
a gateway coupled to a first communication system and a Voice-over Internet Protocol (VoIP) communication system, the first communication system having a subscriber and a Home Location Register (HLR), the subscriber having a mobile device and a profile in the HLR; and
a client application coupled to the mobile device, the client application detecting a coupling with the VoIP communication system and transferring a message to the gateway via the coupling, the message including identification information of the mobile device,
wherein the gateway determines a VoIP routing number of the VoIP communication system that corresponds to a location of the mobile device,
wherein the gateway establishes an association between the VoIP routing number and an address of the mobile device on the VoIP communication system,
wherein the subscriber's HLR profile is set, via a SS7 message, to transfer calls for the mobile device via the determined VoIP routing number, and
wherein the gateway transfers a call for the mobile device received at the first communication system to the mobile device via the VoIP communication system using the VoIP routing number and address of the mobile device.

9. A system comprising:
circuitry that monitors roaming links of a first communication system, wherein the first communication system includes a home network and a visited network, the home network having a subscriber and a Home Location Register (HLR), the subscriber having a mobile device and a profile in the HLR;
circuitry that detects the mobile device registering with the visited network;
circuitry that receives location information corresponding to a location of the mobile device;
circuitry that selects a Voice-over Internet Protocol (VoIP) routing number corresponding to the location;
circuitry that sets the subscriber's HLR profile, via a SS7 message, to transfer calls for the mobile device via the selected VoIP routing number; and
circuitry that uses the selected VoIP routing number to transfer calls for the mobile device received at the home network to the mobile device via a VoIP communication system.

10. A device comprising:
a monitoring system that monitors roaming links of a first communication system, wherein the first communication system includes a home network and a visited network, the home network having a subscriber and a Home Location Register (HLR), the subscriber having a mobile device and a profile in the HLR;
a detector that detects the mobile device registering with the visited network;
a receiver that receives location information corresponding to a location of the mobile device;
a selection system that selects a Voice-over Internet Protocol (VoIP) routing number corresponding to the location;
circuitry that sets the subscriber's HLR profile, via a SS7 message, to transfer calls for the mobile device via the selected VoIP routing number; and
a transmitter that uses the selected VoIP routing number to transfer calls for the mobile device received at the home network to the mobile device via a VoIP communication system.

11. The device of claim 10 wherein the first communication system is a cellular system.

12. The device of claim 10, wherein receiving location information further comprises receiving at least one of an International Mobile Subscriber Identity (IMSI), a Visited Location Register (VLR), a Visited Mobile Switching Center (VMSC), and subscription information of the mobile device.

13. The device of claim 10, wherein receiving location information further comprises receiving location information from Mobile Application Part (MAP) transaction messages between the mobile device and the first communication system.

14. The device of claim 10, wherein selecting a VoIP routing number further comprises selecting a local number from a set of numbers that corresponds to at least one of a country, zone, and network of the location of the mobile device.

15. The device of claim 10, wherein the mobile device includes at least one of a cellular telephone, personal computer, portable computing device, portable telephone, portable communication device, subscriber device, and personal digital assistant.

16. A device comprising:
means for monitoring at least one roaming link of a first communication system, the first communication system having a subscriber and a Home Location Register (HLR), the subscriber having a mobile device and a profile in the HLR;
means for detecting the mobile device registering with a visited network;
means for receiving location information corresponding to a location of the mobile device;
means for selecting a Voice-over Internet Protocol (VoIP) routing number that corresponds to the location, the VoIP routing number corresponding to a VoIP communication system;

means for setting, via a SS7 message, the subscriber's HLR profile to transfer calls for the mobile device via the selected VoIP routing number; and means for transferring calls for the mobile device received at a home network to the mobile device via the VoIP communication system in accordance with the VoIP routing number, wherein the home network and the visited network are networks operating under the first communication system.

17. The device of claim 16, wherein the means for selecting further comprises means for selecting a local number from a set of numbers that corresponds to at least one of a country, zone, and network of the location of the mobile device.

18. The device of claim 16, wherein the mobile device includes at least one of a cellular telephone, personal computer, portable computing device, portable telephone, portable communication device, subscriber device, and personal digital assistant.

19. A method comprising:

monitoring at least one roaming link of a first communication system, the first communication system having a subscriber and a Home Location Register (HLR), the subscriber having mobile device and a profile in the HLR;

detecting the mobile device registering with a visited network;

receiving location information corresponding to a location of the mobile device;

selecting a Voice-over Internet Protocol (VoIP) routing number that corresponds to the location, the VoIP routing number corresponding to a VoIP communication system;

setting the subscriber's HLR profile, via a SS7 message, to transfer calls for the mobile device via the selected VoIP routing number; and transferring calls for the mobile device received at a home network to the mobile device via the VoIP communication system in accordance with the VoIP routing number, wherein the home network and the visited network are networks operating under the first communication system.

20. The method of claim 19, wherein the first communication system is a cellular system.

21. The method of claim 19, wherein the detecting further comprises at least one of intercepting a signal of the mobile device and probing the signal.

22. The method of claim 19, wherein receiving location information further comprises receiving at least one of an International Mobile Subscriber Identity (IMSI), a Visited Location Register (VLR), a Visited Mobile Switching Center (VMSC), and subscription information of the mobile device.

23. The method of claim 19, further comprising assigning at least one set of VoIP routing numbers to the home network of the mobile device, wherein assigning includes the VoIP communication system assigning the set of VoIP routing numbers.

24. The method of claim 19, wherein selecting a VoIP routing number further comprises selecting a local number from a set of numbers that corresponds to at least one of a country, zone, and network of the visited network.

25. The method of claim 19, wherein the mobile device includes at least one of cellular telephones, personal computers, portable computing devices, portable telephones, portable communication devices, subscriber devices, and personal digital assistants.

26. The method of claim 19, wherein receiving location information further comprises receiving location information from Mobile Application Part (MAP) transaction messages between the mobile device and the first communication system.

27. The method of claim 26, wherein the MAP transaction messages are transferred between the HLR and a Visited Location Register (VLR) of a Visited Public Mobile Network (VPMN) with which the mobile device is roaming.

28. The method of claim 19, further comprising determining if unconditional call forwarding is enabled at the mobile device.

29. The method of claim 28, further comprising, in response to determining that unconditional call forwarding is disabled, registering the selected VoIP routing number at the subscriber's HLR profile.

30. The method of claim 19, wherein transferring further comprises:

forwarding the received call to the VoIP communication system;

requesting the selected VoIP routing number;

receiving the selected VoIP routing number in response to the request; and routing the received call through the VoIP communication system to the mobile device using the selected VoIP routing number.

31. The method of claim 30, wherein requesting the selected VoIP routing number comprises transferring a request for the selected VoIP routing number from the VoIP communication system to the visited network via the home network.

32. The method of claim 30, wherein receiving the selected VoIP routing number comprises receiving the selected VoIP routing number at the VoIP communication system from the visited network via the home network.

33. A method comprising:

detecting at a mobile device of a subscriber of a cellular network, a coupling with an Internet Protocol (IP) network, the cellular network having a Home Location Register (HLR), the subscriber having a profile in the HLR;

transferring a message to a gateway of the IP network via the coupling, the message including identification information of the mobile device;

selecting a Voice-over Internet Protocol (VoIP) routing number that corresponds to a location of the mobile device, the VoIP routing number corresponding to the IP network;

establishing an association between the selected VoIP routing number and an IP address of the mobile device;

setting, via a SS7 message, the subscriber's HLR profile to transfer calls for the mobile device via the selected VoIP routing number; and transferring a call received for the mobile device at the cellular network to the mobile device via the IP network using the VoIP routing number and the IP address of the mobile device.

34. The method of claim 33, further comprising determining the location of the mobile device.

35. The method of claim 33, further comprising determining if unconditional call forwarding is enabled at the mobile device.

36. The method of claim 33, further comprising assigning at least one set of VoIP routing numbers in response to the location of the mobile device.

37. The method of claim 33, wherein selecting a VoIP routing number further comprises selecting a local number from a set of numbers that corresponds to at least one of a country, zone, and network of the location of the mobile device.

38. The method of claim 33, wherein the mobile device includes at least one of a cellular telephone, Wireless Fidelity (WiFi) device, personal computer, portable computing device, portable telephone, portable communication device, subscriber device, and personal digital assistant.

* * * * *